United States Patent
Kondou et al.

(10) Patent No.: US 10,755,541 B2
(45) Date of Patent: *Aug. 25, 2020

(54) SURVEILLANCE CAMERA

(71) Applicant: PANASONIC I-PRO SENSING SOLUTIONS CO., LTD., Fukuoka (JP)

(72) Inventors: Masayoshi Kondou, Fukuoka (JP); Yuki Yoshikuni, Fukuoka (JP); Yu Jojima, Fukuoka (JP); Takashi Saito, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/428,124

(22) Filed: May 31, 2019

(65) Prior Publication Data
US 2019/0287360 A1    Sep. 19, 2019

Related U.S. Application Data

(63) Continuation of application No. 16/050,403, filed on Jul. 31, 2018, now Pat. No. 10,388,133.

(30) Foreign Application Priority Data

Feb. 26, 2018 (JP) .................. 2018-031778
Feb. 26, 2018 (JP) .................. 2018-031784
Feb. 26, 2018 (JP) .................. 2018-031786

(51) Int. Cl.
*H04N 7/18* (2006.01)
*G08B 13/196* (2006.01)
*G03B 17/00* (2006.01)

(52) U.S. Cl.
CPC ....... *G08B 13/19632* (2013.01); *G03B 17/00* (2013.01); *G08B 13/1963* (2013.01);
(Continued)

(58) Field of Classification Search
CPC ........ B60Q 3/258; B60Q 1/22; B60Q 1/2665; B60Q 1/503; B60Q 1/54; B60Q 3/59;
(Continued)

(56) References Cited

U.S. PATENT DOCUMENTS 3,731,606 A * 5/1973 Geoffray ............... G03B 35/24
                                                         396/324
6,141,034 A   10/2000 McCutchen
(Continued)

FOREIGN PATENT DOCUMENTS

EP    2876349    5/2015
EP    2887328    6/2015
(Continued)

OTHER PUBLICATIONS

Office Action issued in Japanese Patent Application No. JP 2018-031786, dated Jun. 26, 2018 along with an English translation thereof.
(Continued)

*Primary Examiner* — Gims S Philippe
(74) *Attorney, Agent, or Firm* — Greenblum & Bernstein P.L.C.

(57) ABSTRACT

A dome type surveillance camera includes a base, a plurality of cameras, a first connecting section, a plurality of second connecting sections, a hemispherical cover fixed to the base, and a circular rail. The first connecting section is connected on the base and connected with one first camera out of the plurality of cameras. The second connecting sections are connected on the base and connected with each of a plurality of second cameras excluding the first camera out of the
(Continued)

plurality of cameras. The cover is disposed to cover the first connecting section, the second connecting sections, and the plurality of cameras. The rail is provided on the base and of which a center is immediately below a top of the cover.

6 Claims, 18 Drawing Sheets

(52) U.S. Cl.
CPC . *G08B 13/19617* (2013.01); *G08B 13/19619* (2013.01); *G08B 13/19628* (2013.01); *G08B 13/19639* (2013.01)

(58) Field of Classification Search
CPC ........ G08B 13/19619; G08B 13/19628; G08B 13/1963; G08B 13/19632; H04N 7/18; H04N 7/181; H04N 5/2251; H04N 5/247; H04N 5/2252; H04N 7/183; H04N 5/4403
USPC .......................................... 348/143
See application file for complete search history.

(56) References Cited

U.S. PATENT DOCUMENTS

| | | | |
|---|---|---|---|
| 2007/0109407 A1* | 5/2007 | Thompson ....... | G08B 13/19632 348/143 |
| 2012/0098927 A1* | 4/2012 | Sablak ............. | G08B 13/19604 348/36 |
| 2012/0217356 A1 | 8/2012 | Park et al. | |
| 2013/0100292 A1 | 4/2013 | Mojaver | |
| 2014/0153916 A1 | 6/2014 | Kintner | |
| 2014/0160274 A1 | 6/2014 | Ishida et al. | |
| 2016/0191813 A1* | 6/2016 | Wu ....................... | H04N 5/2258 348/159 |
| 2018/0115720 A1 | 4/2018 | Jones | |
| 2018/0165932 A1* | 6/2018 | Larsson ............... | H04N 5/2253 |
| 2018/0275491 A1 | 9/2018 | Shinano et al. | |
| 2019/0227304 A1* | 7/2019 | Eftekhari ............... | G03B 17/55 |

FOREIGN PATENT DOCUMENTS

| | | |
|---|---|---|
| EP | 2919067 | 9/2015 |
| EP | 3009997 | 4/2016 |
| EP | 3168819 | 5/2017 |
| JP | 8-149437 | 6/1996 |
| JP | 2002-290774 | 10/2002 |
| JP | 2008-078793 | 4/2008 |
| JP | 2012-531079 | 12/2012 |
| JP | 2014-115374 | 6/2014 |
| JP | 3191882 | 6/2014 |
| JP | 3191882 | 7/2014 |
| JP | 2015-108822 | 6/2015 |
| JP | 2015-119476 | 6/2015 |
| JP | 2015-176142 | 10/2015 |
| JP | 2016-082585 | 5/2016 |
| JP | 2017-129844 | 7/2017 |
| WO | 2017/115465 | 7/2017 |

OTHER PUBLICATIONS

Notice of Allowance issued in Japanese Patent Application No. JP 2018-031786, dated Sep. 18, 2018 along with an English translation thereof.
The Extended European Search Report dated Mar. 19, 2019 for European Patent Application No. 19151378.7.

* cited by examiner

US 10,755,541 B2

SURVEILLANCE CAMERA

CROSS-REFERENCE TO RELATED APPLICATIONS

This application is a Continuation of U.S. patent application Ser. No. 16/050,403, filed on Jul. 31, 2018, which claims the benefit of Japanese Application Nos.: 2018-031778, filed on Feb. 26, 2018; 2018-031784, filed on Feb. 26, 2018; and 2018-031786, filed on Feb. 26, 2018, the entire disclosures of which applications are incorporated by reference herein.

BACKGROUND

1. Technical Field

The present disclosure relates to a dome type surveillance camera.

2. Description of the Related Art

In the related art, there is an omnidirectional camera that includes a plurality of cameras and can image areas in all directions. For example, in Japanese Patent Unexamined Publication No. 2014-115374, an omnidirectional camera that can acquire a seamless and omnidirectional image and improves the accuracy of measuring location information based on a GPS signal is disclosed.

Even the omnidirectional camera needs to intensively image an area in a predetermined direction in some cases. However, since the plurality of cameras are fixed in Japanese Patent Unexamined Publication No. 2014-115374, the area in the predetermined direction cannot be intensively imaged.

SUMMARY

Examples which do not limit the disclosure contribute to providing a surveillance camera of which an imaging direction can be aligned with various directions.

According to an aspect of the disclosure, there is provided a surveillance camera that is a dome type surveillance camera. The surveillance camera includes a base, a connecting member connected to the base, a plurality of cameras connected to the connecting member such that imaging directions of the cameras move in an elevation angle direction with respect to the base, and a dome type cover fixed to the base so as to cover the connecting member and the plurality of cameras. One camera, out of the plurality of cameras, moves such that the imaging direction of the one camera is aligned with a top of the cover.

According to the aspect of the disclosure, the imaging directions can be aligned with various directions.

An advantage and an effect of the aspect of the disclosure are apparent from the specification and the drawings. Although each of such an advantage and/or effect is provided in several embodiments and characteristics described in the specification and the drawings, not all of the advantage and/or effect are required to be provided in order to obtain one or more of the same characteristics.

DETAILED DESCRIPTION

Hereinafter, an embodiment of the disclosure will be described in detail with reference to appropriate drawings. However, needlessly detailed description will be omitted in some cases. For example, detailed description of matters which are already well known or repeated description of practically the same configurations will be omitted in some cases. That is to avoid the following description being needlessly long, and to promote understanding for those skilled in the art.

The accompanying drawings and the following description are provided to help those skilled in the art sufficiently understand the disclosure. The drawings and the description are not intended to limit the scope of the claims.

Figure 1:
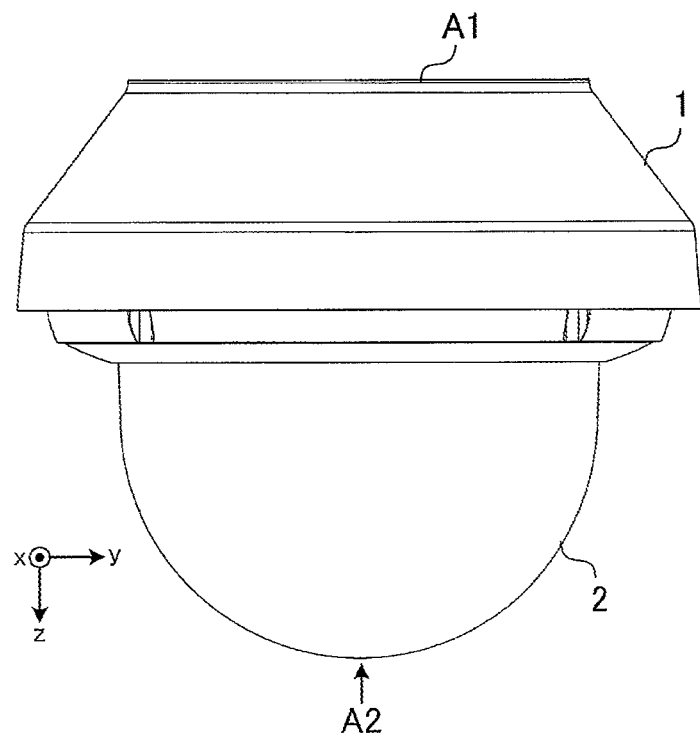
FIG. 1 is a side view of a surveillance camera according to an embodiment of the disclosure.

FIG. 1 is a side view of a surveillance camera according to the embodiment of the disclosure. The surveillance camera illustrated in FIG. 1 is provided, for example, on a traffic light pole and a utility pole, which are provided at an intersection, or inside or outside a structure such as a building. The surveillance camera is connected to, for example, an information processing device such as a personal computer, and transmits a captured image to the information processing device. Hereinafter, three coordinate axes illustrated in FIG. 1 are set with respect to the surveillance camera.

As illustrated in FIG. 1, the surveillance camera has housing 1 and cover 2. Housing 1 has fixing surface A1 on a bottom. The surveillance camera is fixed to, for example, a traffic light pole, a utility pole, or a structure, such as a building, via fixing surface A1.

Cover 2 is a dome type cover, and has a hemispheric shape. Cover 2 is formed of, for example, a transparent material such as glass or plastic. A portion indicated by arrow A2 of FIG. 1 is a top of cover 2.

Cover 2 is fixed to housing 1 so as to cover a plurality of cameras (for example, refer to FIG. 2 or 3) mounted on housing 1. Cover 2 protects the plurality of cameras mounted on housing 1.

Figure 2:
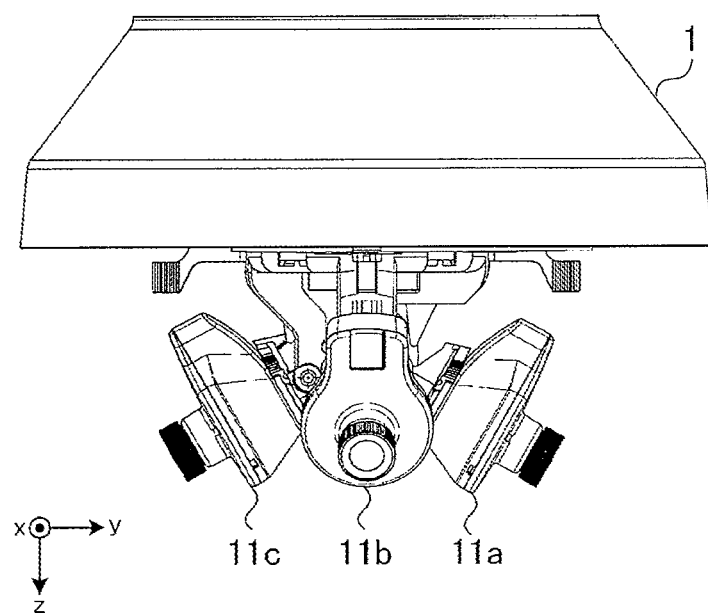
FIG. 2 is a side view of the surveillance camera in a state where a cover is removed.

FIG. 2 is a side view of the surveillance camera in a state where cover 2 is removed. In FIG. 2, the same elements as FIG. 1 are assigned with the same reference signs.

As illustrated in FIG. 2, the surveillance camera has a plurality of cameras 11a, 11b, and 11c. Although the surveillance camera according to the embodiment of the disclosure has four cameras, another camera is hidden behind camera 11b (−x axis direction) in FIG. 2.

Figure 3:
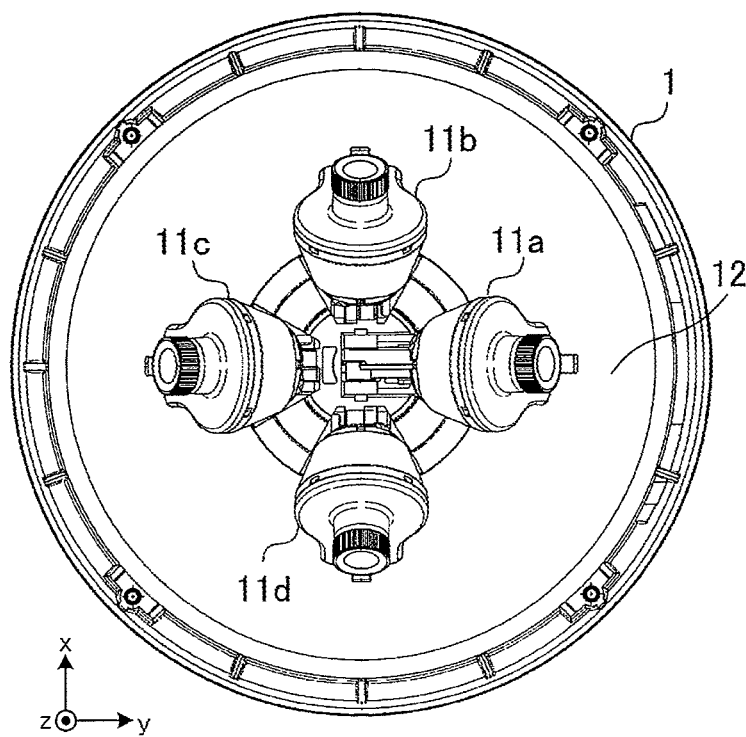
FIG. 3 is a front view of the surveillance camera in the state where the cover is removed.

FIG. 3 is a front view of the surveillance camera in a state where cover 2 is removed. In FIG. 3, the same elements as FIG. 2 have the same reference signs. As illustrated in FIG. 3, the surveillance camera has four cameras 11a to 11d. Imaging directions of cameras 11a to 11d (for example, directions perpendicularly extending from lens surfaces) are adjusted (moved) by a user's hand.

Housing 1 has base 12. Base 12 is a plate-shaped member, and has a circular shape when seen from the front of the device (+z axis direction). As will be described later in detail, cameras 11a to 11d are movably fixed (connected) to base 12.

The center of base 12 is located immediately below the top of cover 2 (right below the top). For example, the center of base 12 is located right below the top of cover 2, which is indicated with arrow A2 of FIG. 1.

Figure 4:
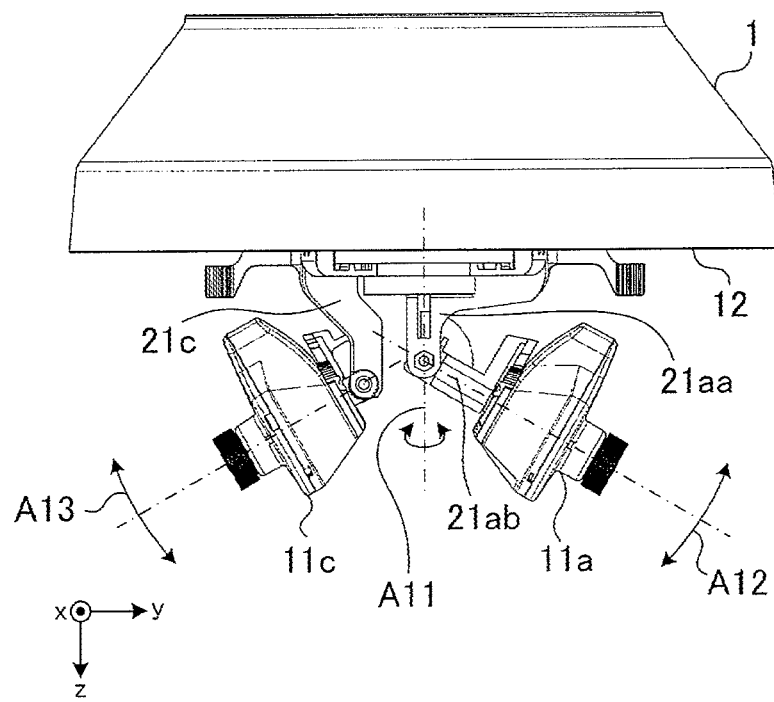
FIG. 4 is a side view of the surveillance camera in the state where the cover is removed.

FIG. 4 is a side view of the surveillance camera in a state where cover 2 is removed. In FIG. 4, the same elements as FIGS. 2 and 3 are assigned with the same reference signs. In FIG. 4, cameras 11a and 11c are illustrated and the illustration of cameras 11b and 11d is omitted in order to simplify description. As illustrated in FIG. 4, the surveillance camera has connecting members 21aa, 21ab, and 21c.

Connecting member 21aa extends from the center of base 12 toward the top of cover 2. In other words, connecting member 21aa extends from base 12 located immediately below the top of cover 2 toward the top of cover 2.

Connecting member 21aa has an axis extending from the center of base 12 toward the top of cover 2, and rotates about the axis. For example, axis A11 illustrated in FIG. 4 is an axis of connecting member 21aa extending from the center of base 12 toward the top of cover 2. Connecting member 21aa rotates in a right-and-left direction about axis A11 of FIG. 4, which is a rotation axis.

One end of connecting member 21ab is connected to an end portion of connecting member 21aa on a side opposite to base 12. In addition, the other end of connecting member 21ab is connected to camera 11a.

The one end of connecting member 21ab is connected to connecting member 21aa such that the other end moves in an elevation angle direction with respect to base 12. That is, the other end of connecting member 21ab moves in the elevation angle direction with respect to base 12. Hereinafter, the elevation angle direction with respect to base 12 will be simply called an elevation angle direction in some cases.

As described above, the other end of connecting member 21ab is connected to camera 11a. The other end of connecting member 21ab moves in the elevation angle direction. Therefore, the imaging direction of camera 11a moves in the elevation angle direction. For example, arrow A12 illustrated in FIG. 4 indicates the elevation angle direction with respect to base 12. The imaging direction of camera 11a moves in an arrow A12 direction of FIG. 4.

Connecting member 21c extends from a position separated away from the center of base 12 toward the top of cover 2. For example, connecting member 21c extends from a point where axis A11 of connecting member 21aa and base 12 intersect (position separated away from the center of base 12) toward the top of cover 2. As will be described later, connecting member 21c is connected to base 12 so as to be movable on a circumference of which the center corresponds to the center of base 12 (for example, refer to rail 41 of FIG. 10 or 12).

Camera 11c is connected to an end portion of connecting member 21c on a side opposite to base 12. Camera 11c is connected to connecting member 21c such that the imaging direction thereof moves in an elevation angle direction. For example, arrow A13 illustrated in FIG. 4 indicates the elevation angle direction with respect to base 12. The imaging direction of camera 11c moves in an arrow A13 direction of FIG. 4.

Figure 5:
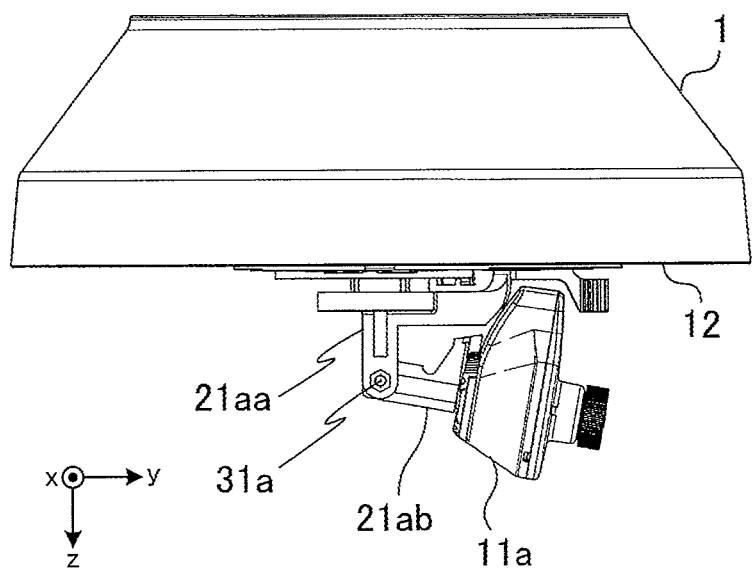
FIG. 5 is a side view of the surveillance camera in the state where the cover is removed.

FIG. 5 is a side view of the surveillance camera in a state where cover 2 is removed. In FIG. 5, the same elements as FIG. 4 are assigned with the same reference signs. In FIG. 5, camera 11a is illustrated in order to simplify description, and the illustration of camera 11c, which is illustrated in FIG. 4, is omitted. As illustrated in FIG. 5, the surveillance camera has shaft member 31a.

Shaft member 31a connects connecting member 21aa to connecting member 21ab. Shaft member 31a connects connecting member 21ab to connecting member 21aa such that the other end of connecting member 21ab (side on which camera 11a is mounted) moves in the elevation angle direction.

Figure 6:
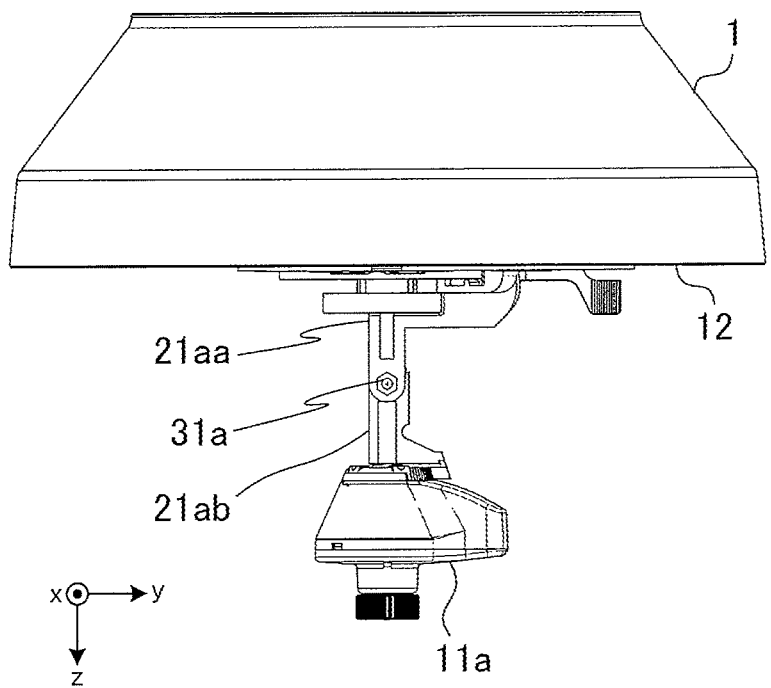
FIG. 6 is a view illustrating a state where an imaging direction of a camera is aligned with a top direction of the cover.

FIG. 6 is a view illustrating a state where the imaging direction of camera 11a is aligned with a top direction of cover 2. In FIG. 6, the same elements as FIG. 5 are assigned with the same reference signs.

Connecting member 21ab rotates with respect to connecting member 21aa about the center axis of shaft member 31a, which is a rotation axis. Accordingly, the imaging direction of camera 11a can be aligned with the top direction of cover 2 (+z axis direction) as illustrated in FIG. 6.

Connecting member 21*ab* may rotate with respect to connecting member 21*aa* such that the other end traverses the top direction. That is, the imaging direction of camera 11*a* may move out of the top direction of cover 2.

Figure 7:
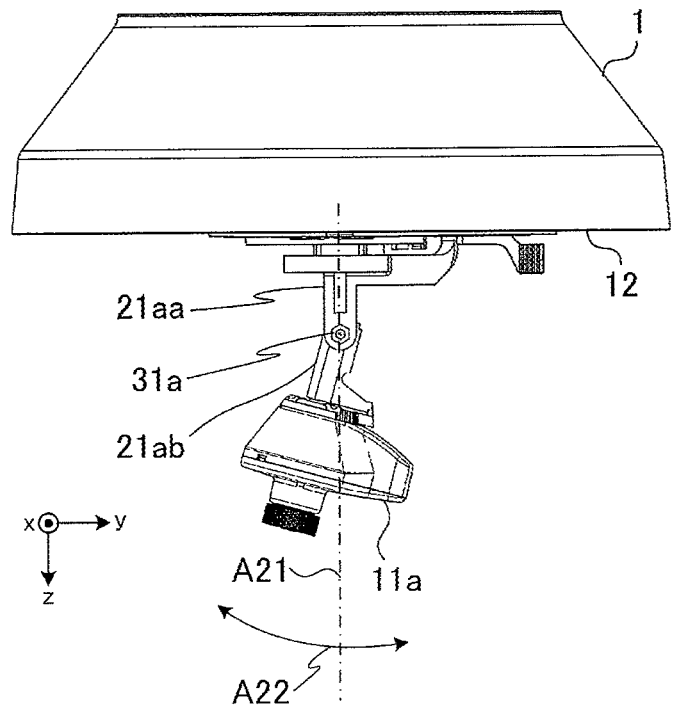
FIG. 7 is a view illustrating a state where the imaging direction of the camera has moved out of the top direction of the cover.

FIG. 7 is a view illustrating a state where the imaging direction of camera 11*a* has moved out of the top direction of cover 2. In FIG. 7, the same elements as FIGS. 5 and 6 are assigned with the same reference signs.

The imaging direction of camera 11*a* illustrated in FIG. 7 has moved so as to traverse the top direction of cover 2 in contrast to camera 11*a* illustrated in FIG. 6. For example, one-dot chain line A21 illustrated in FIG. 7 indicates the top direction of cover 2. The imaging direction of camera 11*a* moves so as to traverse the one-dot chain line A21 as indicated with arrow A22 of FIG. 7. A movable range of the imaging direction of camera 11*a* with respect to the elevation angle direction is, for example, 10 degrees to 110 degrees with respect to base 12.

The imaging directions of cameras 11*b* to 11*d* (for example, refer to FIG. 3) other than camera 11*a* do not move so as to traverse the top direction of cover 2. That is, out of four cameras 11*a* to 11*d*, one camera 11*a* moves so as to traverse the top direction of cover 2. A movable range of each of the imaging directions of cameras 11*b* to 11*d* with respect to the elevation angle direction is, for example, 10 degrees to 80 degrees with respect to base 12.

Shaft member 31*a* may be provided so as to be located at a center point of cover 2 having a hemispheric shape. In this case, camera 11*a* (lens of camera 11*a*) moves such that a trajectory thereof in the elevation angle direction with respect to base 12 follows a curved surface of cover 2. Accordingly, camera 11*a* moves in the elevation angle direction while keeping a fixed distance to cover 2, and can prevent a change in the index of refraction of cover 2 caused by a change in the distance to cover 2.

As illustrated in FIG. 4, connecting member 21*aa* rotates in the right-and-left direction about axis A11 illustrated in FIG. 4, which is a rotation axis. That is, the imaging direction of camera 11*a* rotates in an azimuth direction of base 12 about an axis extending from base 12 in the top direction of cover 2, which is a rotation axis.

Figure 8:
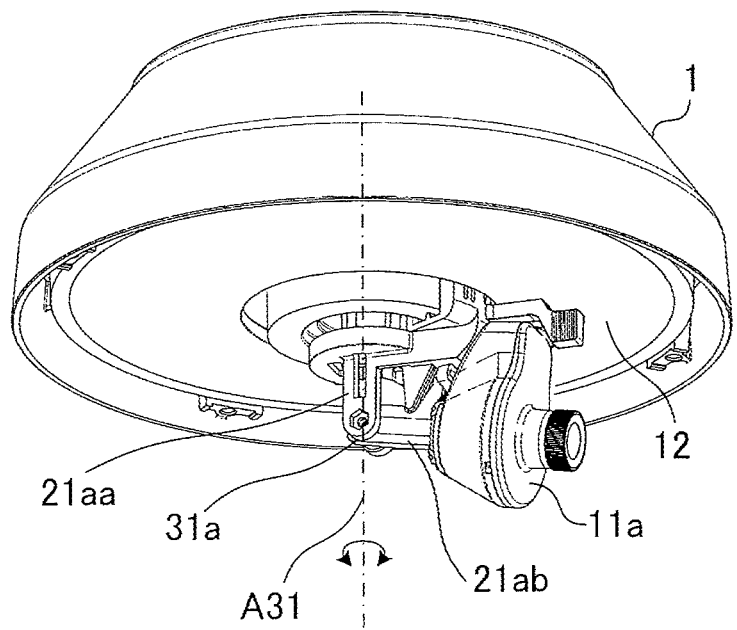
FIG. 8 is a view illustrating rotation of the camera with the top direction of the cover as a rotation axis.

FIG. 8 is a view illustrating rotation of camera 11*a* with the top direction of cover 2 as a rotation axis. FIG. 8 is a perspective view of the surveillance camera seen from a cover 2 side. In FIG. 8, the same elements as FIG. 7 are assigned with the same reference signs.

As illustrated in FIG. 8, connecting member 21*aa* extends from the center of circular base 12 toward the top direction of cover 2, and rotates in the right-and-left direction about axis A31 of FIG. 8, which is a rotation axis. Accordingly, the imaging direction of camera 11*a* connected to connecting members 21*aa* and 21*ab* rotates in the right-and-left direction about axis A31, which is a rotation axis.

Figure 9:
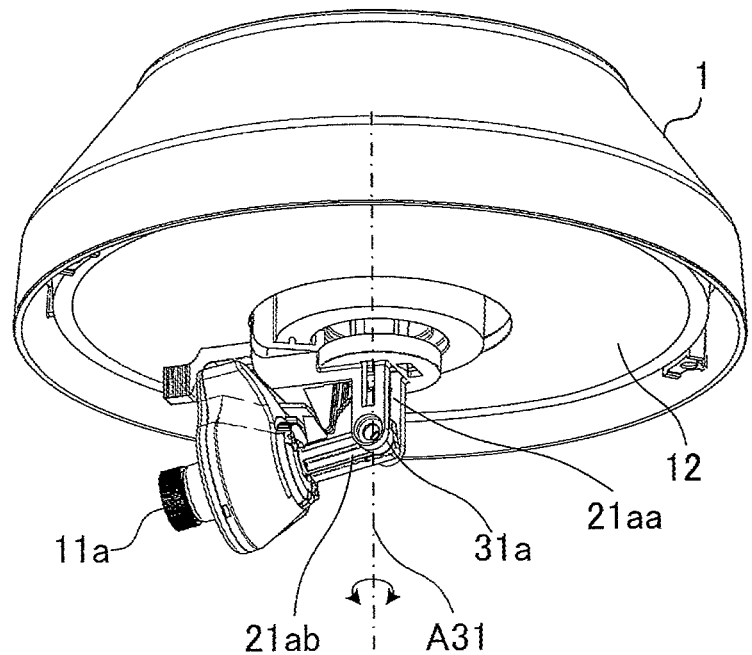
FIG. 9 is a view illustrating a state where the camera has rotated with the top direction of the cover as a rotation axis.

FIG. 9 is a view illustrating a state where camera 11*a* has rotated with the top direction of cover 2 as a rotation axis. In FIG. 9, the same elements as FIG. 8 are assigned with the same reference signs.

The imaging direction of camera 11*a* illustrated in FIG. 9 has changed from the imaging direction of camera 11*a* illustrated in FIG. 8. As illustrated in FIGS. 8 and 9, camera 11*a* rotates about connecting member 21*aa* extending from the center of circular base 12 toward the top direction of cover 2, which is a rotation axis.

Figure 10:
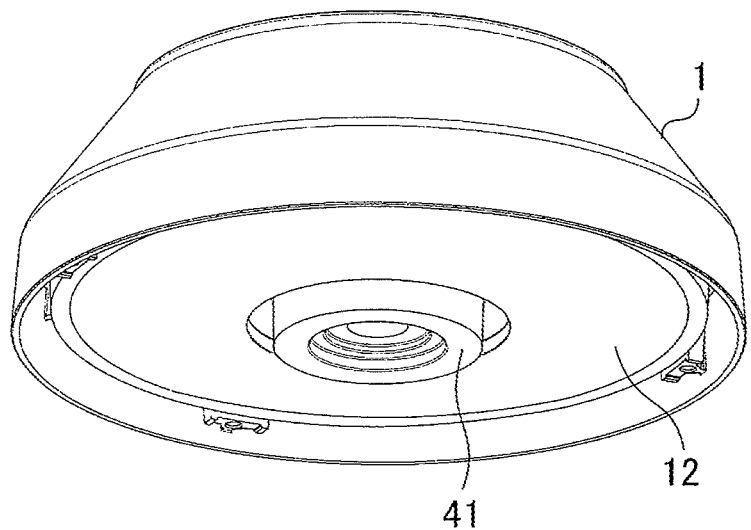
FIG. 10 is a view illustrating a housing and a base of the surveillance camera.

FIG. 10 is a view illustrating housing 1 and base 12 of the surveillance camera. In FIG. 10, the same elements as FIG. 9 are assigned with the same reference signs. As illustrated in FIG. 10, base 12 has circular rail 41 having a fixed width. The center of circular rail 41 matches the center of base 12.

Figure 11:
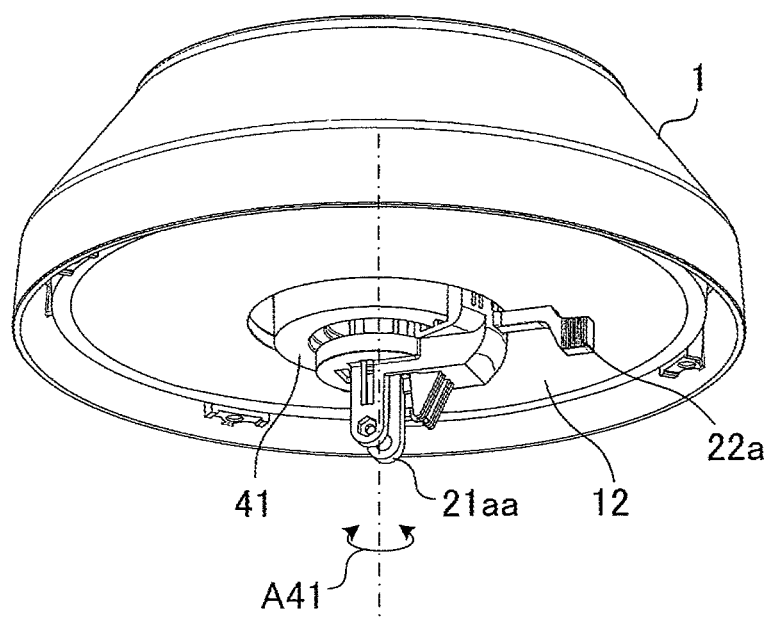
FIG. 11 is a view of a connecting member mounted on the base illustrated in FIG. 10.

FIG. 11 is a view of connecting member 21*aa* mounted on base 12 illustrated in FIG. 10. In FIG. 11, the same elements as FIG. 10 are assigned with the same reference signs.

As illustrated in FIG. 11, connecting member 21*aa* has gripper 22*a*. Gripper 22*a* extends from connecting member 21*aa* in the azimuth direction so as to be parallel to a surface of base 12.

Connecting member 21*aa* rotates in the azimuth direction of base 12 in response to an operation of gripper 22*a* by a user. For example, connecting member 21*aa* rotates in a direction of arrow A41 of FIG. 11. Accordingly, the imaging direction of camera 11*a* connected to connecting member 21*aa* rotates in the azimuth direction via connecting member 21*ab* (refer to camera 11*a* of FIGS. 8 and 9). Hereinafter, the azimuth direction of base 12 will be simply called an azimuth direction in some cases.

As illustrated in FIG. 11, connecting member 21*aa* that connects camera 11*a* having an imaging direction aligned with the top direction of cover 2 is connected to base 12 at the center of base 12. On the contrary, connecting members that connect cameras 11*b* to 11*d* having imaging directions not aligned with the top direction of cover 2 are connected to base 12 (rail 41) off the center of base 12.

Figure 12:
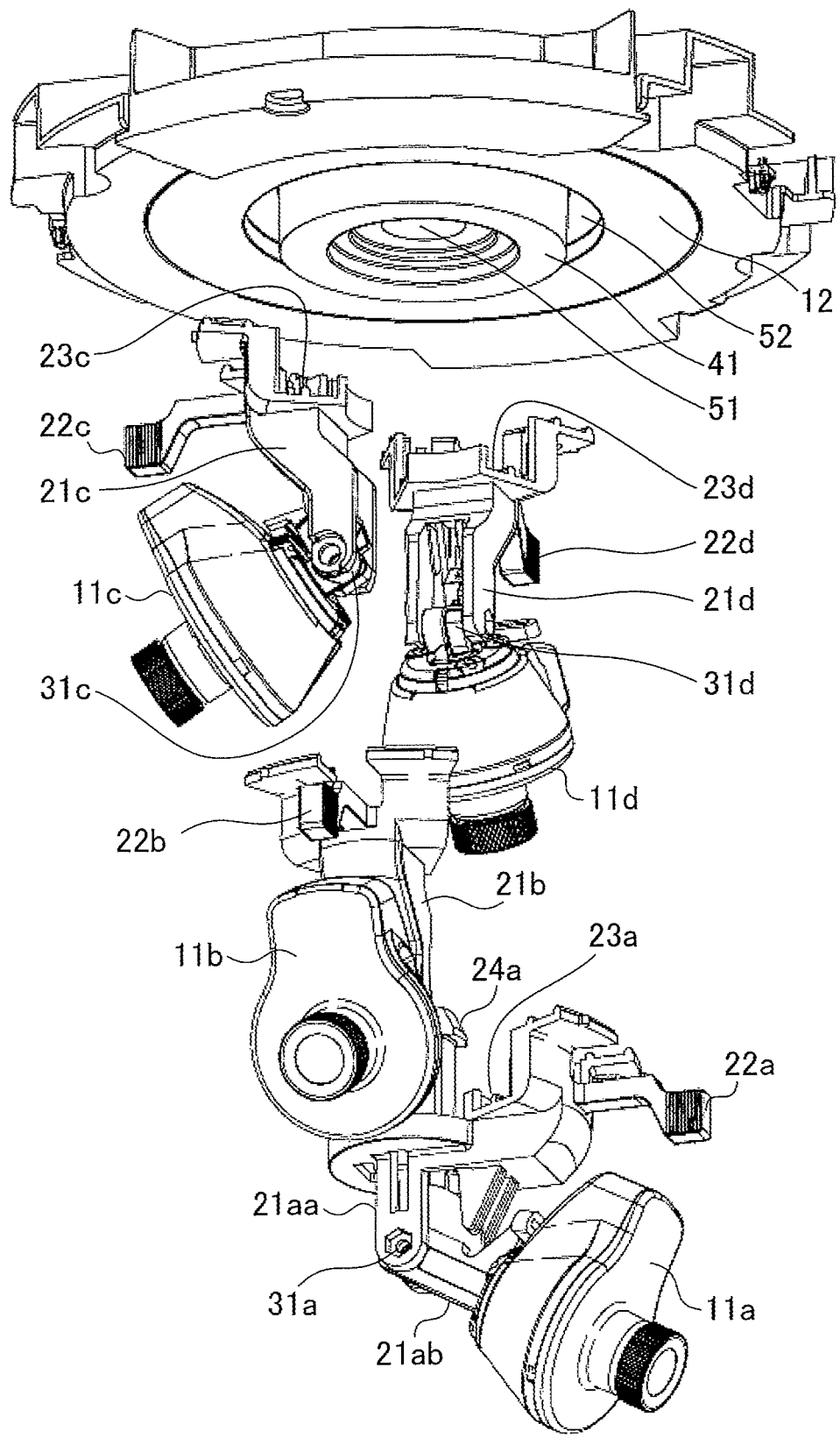
FIG. 12 is a view illustrating connection of the connecting member to the base.

FIG. 12 is a view illustrating connection of connecting members 21*aa* and 21*b* to 21*d* to base 12. In FIG. 12, the same elements as FIG. 11 are assigned with the same reference signs. FIG. 12 is a perspective view of the surveillance camera seen from the cover 2 side.

At the center of rail 41, hole 51 is formed. In addition, concentric hole 52 is formed on the outside of rail 41.

Camera 11*a* is connected to connecting member 21*ab*. Connecting member 21*ab* is connected to connecting member 21*aa* via shaft member 31*a*. Connecting member 21*aa* has gripper 22*a*, fitting portion 23*a*, and protrusion 24*a* (a part thereof is hidden behind camera 11*b*) extending in an upward direction in FIG. 12.

Protrusion 24*a* passes through hole 51 formed in the center of base 12. Fitting portion 23*a* has a dent shape such that rail 41 is sandwiched therein. Fitting portion 23*a* is slidably fitted to rail 41 of base 12. That is, fitting portion 23*a* slides along rail 41. Accordingly, connecting member 21*ab* can rotate in the azimuth direction in response to an operation of gripper 22*a* by a user.

Camera 11*b* is connected to connecting member 21*b* via a shaft member (not illustrated). Camera 11*b* rotates about the center axis of the shaft member, which is a rotation axis, such that the imaging direction thereof moves in the elevation angle direction.

Connecting member 21*b* has gripper 22*b* and fitting portion 23*b* (not illustrated). Connecting member 21*b* slides along rail 41 in response to an operation of gripper 22*b* by a user. That is, the imaging direction of camera 11*b* can rotate in the azimuth direction in response to the operation by the user.

Camera 11*c* is connected to connecting member 21*c* via shaft member 31*c*. Camera 11*c* rotates about shaft member 31*c*, which is a rotation axis, such that the imaging direction thereof moves in the elevation angle direction.

Connecting member 21*c* has gripper 22*c* and fitting portion 23*c*. Fitting portion 23*c* has a dent shape such that rail 41 is sandwiched therein. Fitting portion 23*c* is slidably fitted to rail 41 of base 12. That is, fitting portion 23*c* slides along rail 41. Accordingly, connecting member 21*c* slides along rail 41 in response to an operation of gripper 22c by a user, and the imaging direction of camera 11c can rotate in the azimuth direction.

Camera 11d is connected to connecting member 21d via shaft member 31d. Camera 11d rotates about shaft member 31d, which is a rotation axis, such that the imaging direction thereof moves in the elevation angle direction.

Connecting member 21d has gripper 22d and fitting portion 23d. Fitting portion 23d has a dent shape such that rail 41 is sandwiched therein. Fitting portion 23d is slidably fitted to rail 41 of base 12. That is, fitting portion 23d slides along rail 41. Accordingly, connecting member 21d slides along rail 41 in response to an operation of gripper 22d by a user, and the imaging direction of camera 11d can rotate in the azimuth direction.

Connecting members 21b to 21d of cameras 11b to 11d each have the same shape or structure. Connecting members 21b to 21d of cameras 11b to 11d are connected to base 12 off the center of base 12. On the other hand, connecting member 21aa of camera 11a is connected to base 12 at the center of base 12. Accordingly, camera 11a, out of the plurality of cameras 11a to 11d, can face the top direction of cover 2.

Figure 13:
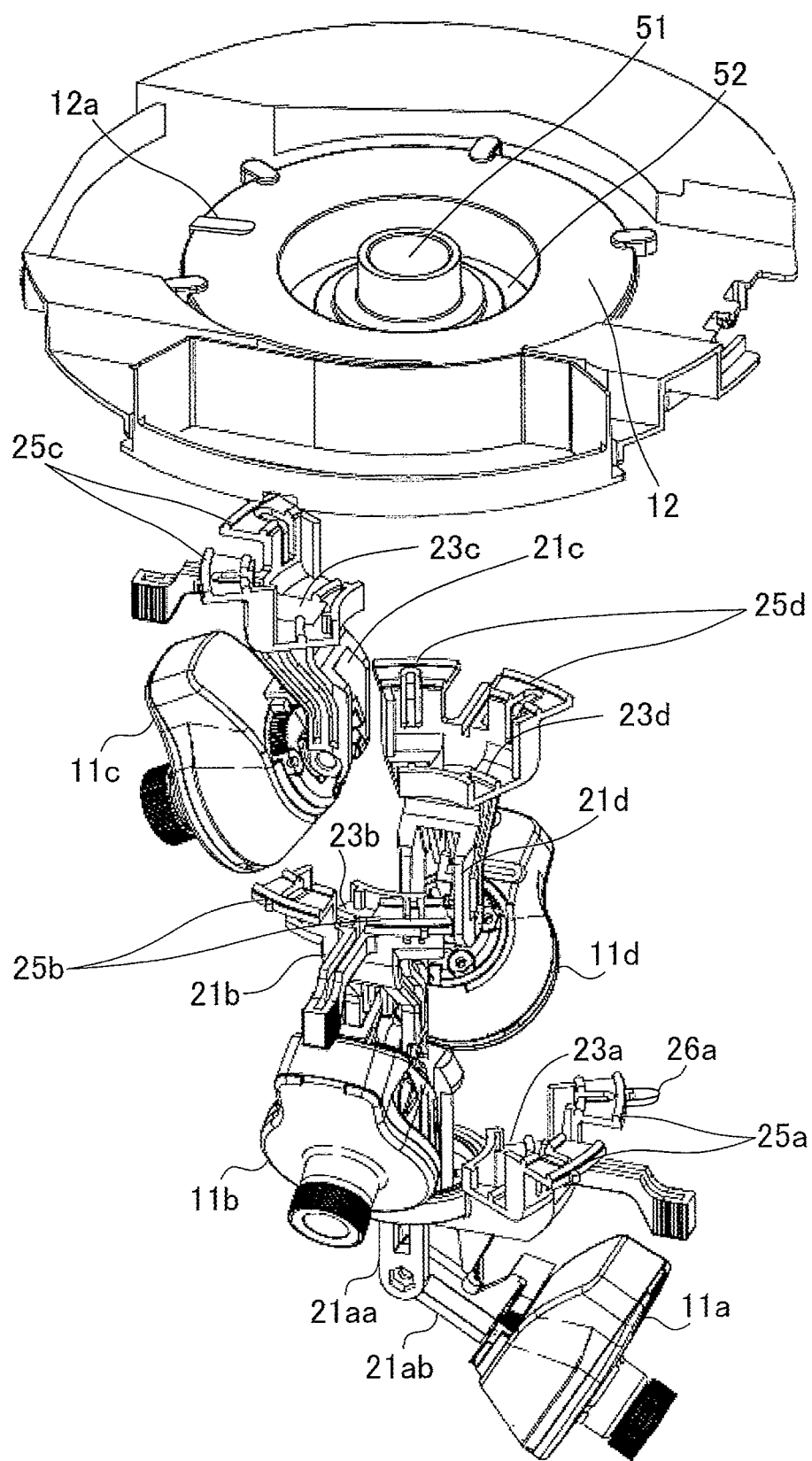
FIG. 13 is a view illustrating the connection of the connecting member to the base.

FIG. 13 is a view illustrating connection of connecting members 21aa and 21b to 21d to base 12. In FIG. 13, the same elements as FIG. 12 are assigned with the same reference signs. FIG. 13 is a perspective view of the surveillance camera seen from a housing 1 side. FIG. 13 also illustrates fitting portion 23b of connecting member 21b of which illustration is omitted in FIG. 12.

As illustrated in FIG. 13, flange 25a is formed on an end portion of fitting portion 23a of connecting member 21aa. Flange 25a comes into contact with the back surface of base 12 through concentric hole 52 formed in base 12. Connecting member 21aa does not fall in the direction of cover 2 since flange 25a supports the back surface of base 12.

Flange 25b is formed on an end portion of fitting portion 23b of connecting member 21b. Flange 25b comes into contact with the back surface of base 12 through concentric hole 52 formed in base 12. Connecting member 21b does not fall in the direction of cover 2 since flange 25b supports the back surface of base 12.

Flange 25c is formed on an end portion of fitting portion 23c of connecting member 21c. Flange 25c comes into contact with the back surface of base 12 through concentric hole 52 formed in base 12. Connecting member 21c does not fall in the direction of cover 2 since flange 25c supports the back surface of base 12.

Flange 25d is formed on an end portion of fitting portion 23d of connecting member 21d. Flange 25d comes into contact with the back surface of base 12 through concentric hole 52 formed in base 12. Connecting member 21d does not fall in the direction of cover 2 since flange 25d supports the back surface of base 12.

Flange 25a of connecting member 21aa has protrusion 26a. When moved to the position of protrusion 12a provided on the back surface of base 12 by the rotation of connecting member 21aa in the azimuth direction, protrusion 26a comes into contact with protrusion 12a. Accordingly, connecting member 21aa does not rotate 360 degrees or more in the azimuth direction. Other connecting members 21b to 21d also do not rotate 360 degrees or more by connecting member 21aa not rotating 360 degrees or more.

Wiring of cameras 11a to 11d is led to the inside of housing 1 through hole 51. Since connecting members 21aa and 21b to 21d do not rotate 360 degrees or more in the azimuth direction, excessive distortion of the wiring of cameras 11a to 11d is prevented. Any one of flanges 25b to 25d of connecting members 21b to 21d may have protrusion 26a.

Figure 14:
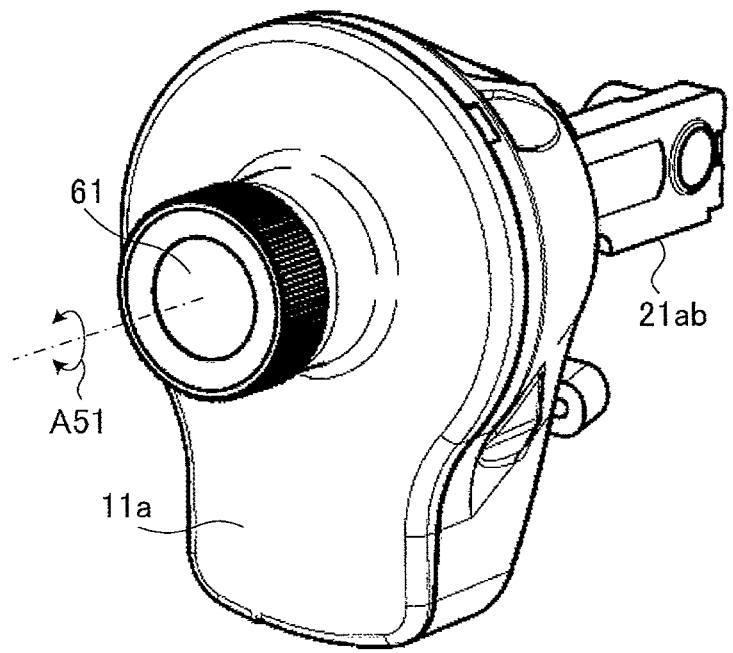
FIG. 14 is a perspective view of the camera seen from the front.

FIG. 14 is a perspective view of camera 11a seen from the front. FIG. 14 illustrates camera 11a and connecting member 21ab connected to camera 11a.

As illustrated in FIG. 14, camera 11a has lens 61 in the front thereof. Camera 11a rotates in the right-and-left direction with the imaging direction thereof as a rotation axis. For example, camera 11a rotates in the right-and-left direction with the imaging direction illustrated with a one-dot chain line as a rotation axis, as indicated with arrow A51 of FIG. 14.

Camera 11a rotates with respect to connecting member 21ab in the right-and-left direction with the imaging direction thereof as a rotation axis. Connecting member 21ab does not rotate in the right-and-left direction with the imaging direction thereof as a rotation axis.

Figure 15:
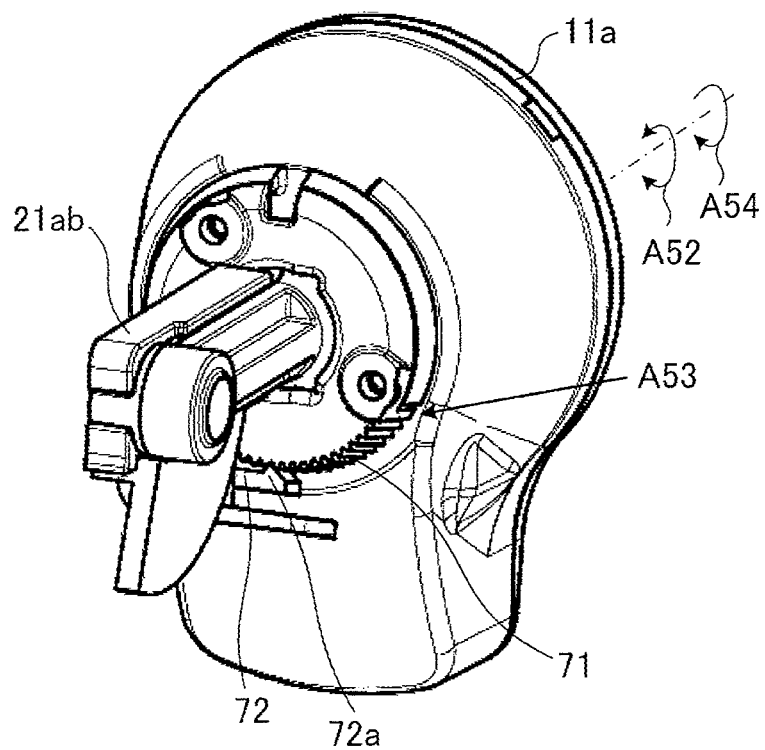
FIG. 15 is a perspective view of the camera seen from the back.

FIG. 15 is a perspective view of camera 11a seen from the back. In FIG. 15, the same elements as FIG. 14 are assigned with the same reference signs.

Camera 11a has gear teeth-shape engaging portion 71 on the back thereof. Engaging portion 71 is formed along the circumference of the camera.

Engaging portion 71 rotates with rotation of the camera with the imaging direction of camera 11a as a rotation axis. For example, when camera 11a rotates in a direction indicated with arrow A52 of FIG. 15, engaging portion 71 also rotates with the rotation of camera 11a.

Figure 16:
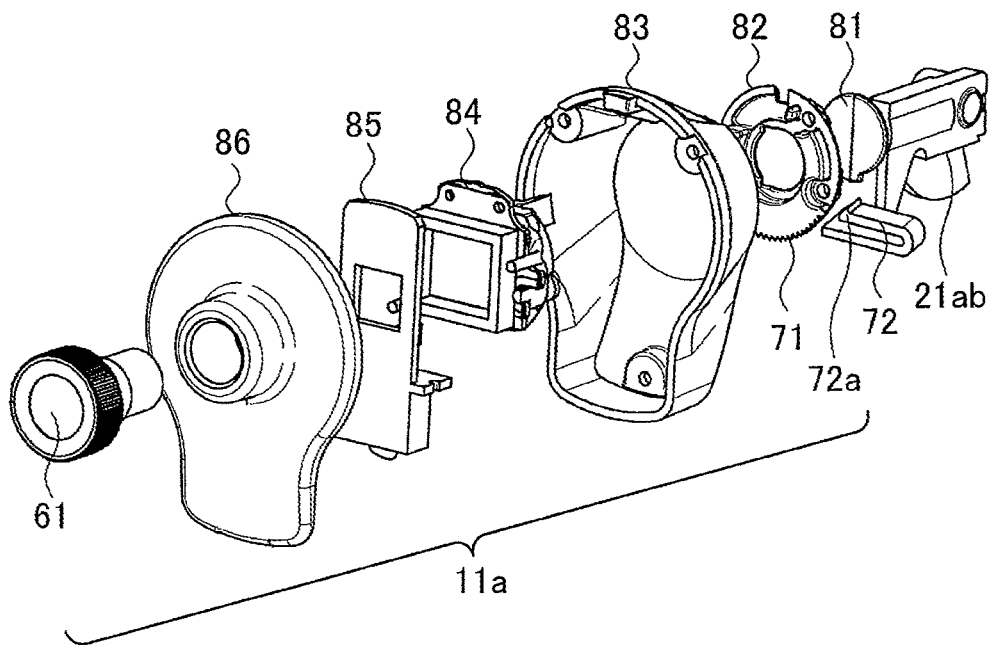
FIG. 16 is an exploded perspective view of the camera seen from the front.

Connecting member 21ab has lever 72 (also refer to FIG. 16). Claw 72a that engages with grooves of engaging portion 71 is provided on an end of lever 72. Lever 72 biases claw 72a in a groove direction of engaging portion 71.

Engaging portion 71 formed on the back of camera 11a rotates with respect to lever 72. By claw 72a of lever 72 being engaged with engaging portion 71, the rotation position of camera 11a is held (maintained) at a predetermined angle by which the camera is rotated by a user.

Camera 11a rotates within a range where engaging portion 71 engages with claw 72a of lever 72. For example, when a portion of engaging portion 71, which is indicated with arrow A53, comes to the position of claw 72a of lever 72, camera 11a does not rotate in the direction of arrow A54.

FIG. 16 is an exploded perspective view of camera 11a seen from the front. In FIG. 16, the same elements as FIGS. 14 and 15 are assigned with the same reference signs.

As illustrated in FIG. 16, connecting member 21ab has circular plate 81. Camera 11a has engaging member 82, covers 83 and 86, imaging element 84, and filter 85. Engaging portion 71 illustrated in FIG. 15 is formed on engaging member 82.

Circular plate 81 of connecting member 21ab has a diameter larger than an opening of engaging member 82. Circular plate 81 of connecting member 21ab passes through the opening of engaging member 82, and engaging member 82 through which circular plate 81 has passed is fixed to cover 83. Accordingly, cover 83 can rotate with respect to connecting member 21ab.

Covers 83 and 86 accommodate imaging element 84 and filter 85. Covers 83 and 86 each have a circular shape and have a shape in which a part thereof projects in a downward direction in FIG. 16. Substantially square imaging element 84 is accommodated in a circular portion of cover 83. Substantially rectangular filter 85 is accommodated in the circular portion and the portion projecting in the downward direction in FIG. 16 of cover 83.

Camera 11a can be miniaturized by covers 83 and 86 each having a shape illustrated in FIG. 16. For example, if the shapes of covers 83 and 86 are circles, the length of filter 85 in a longitudinal direction thereof should be the diameters of the covers. Consequently, the volumes of covers 83 and 86 increase. On the contrary, covers 83 and 86 illustrated in FIG. 16 each have the circular portion accommodating substantially square imaging element 84 and the projecting portion protruding from the circular portion and accommodating substantially rectangular filter 85, thereby achieving miniaturization.

Figure 17:
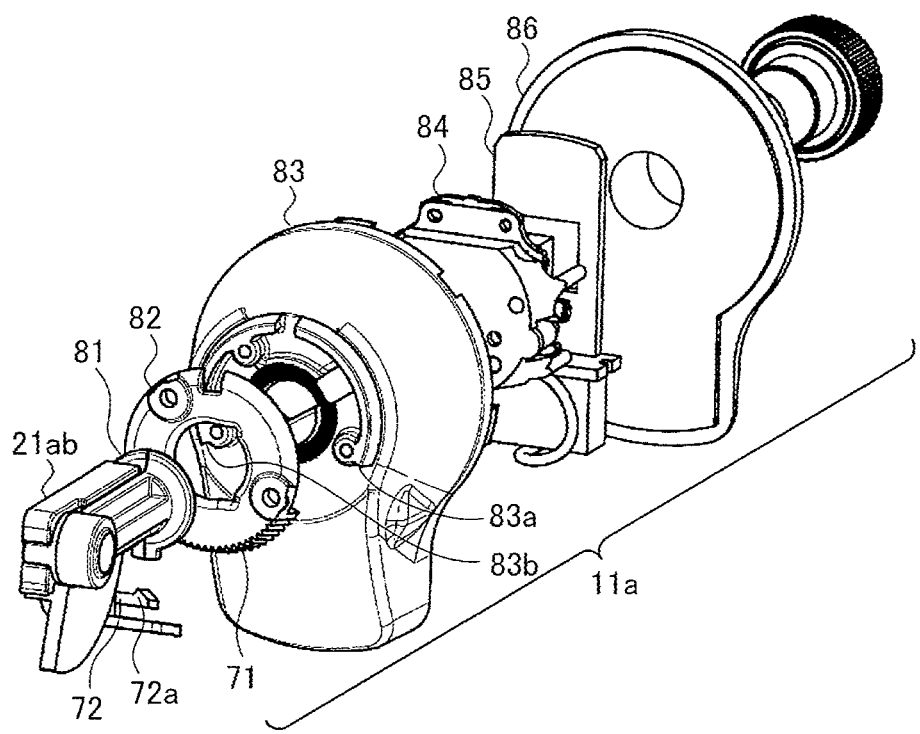
FIG. 17 is an exploded perspective view of the camera seen from the back.

FIG. 17 is an exploded perspective view of camera 11a seen from the back. In FIG. 17, the same elements as FIG. 16 are assigned with the same reference signs.

As illustrated in FIG. 16 as well, circular plate 81 of connecting member 21ab passes through the opening of engaging member 82. Engaging member 82 is fixed to the back of cover 83 in a state where circular plate 81 of connecting member 21ab has passed through the opening.

Accordingly, cover 83 rotates with respect to connecting member 21ab, and engaging member 82 fixed to the back of cover 83 also rotates with respect to connecting member 21ab. Then, engaging portion 71 formed on engaging member 82 rotates with respect to claw 72a of lever 72, and the rotation position of camera 11a is held (maintained) at a predetermined angle by claw 72a of lever 72 engaging with the grooves of engaging portion 71.

Cover 83 has stoppers 83a and 83b. Stoppers 83a and 83b regulate rotation of camera 11a. For example, when stoppers 83a and 83b come to the position of claw 72a of lever 72 by the rotation of cover 83, the stoppers come into contact with claw 72a of lever 72. By coming into contact with claw 72a of lever 72, stoppers 83a and 83b stop the rotation of cover 83 such that cover 83 does not rotate any further.

That is, camera 11a can rotate within a range where engaging portion 71 engages with claw 72a of lever 72. In other words, camera 11a rotates in the right-and-left direction by up to a predetermined angle with the imaging direction thereof as a rotation axis, and cannot rotate beyond the predetermined angle.

Figure 18A:
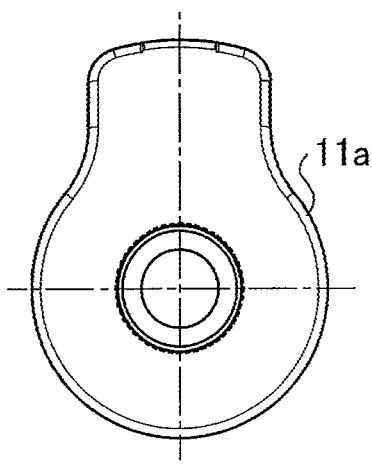
FIG. 18A is a view illustrating a rotation range of the camera.
Figure 18B:
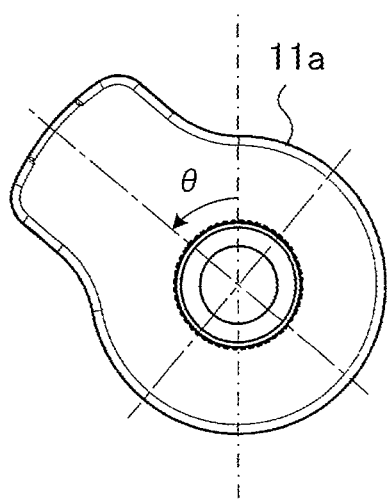
FIG. 18B is a view illustrating the rotation range of the camera.
Figure 18C:
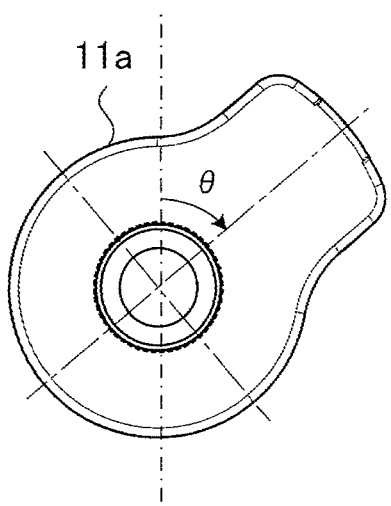
FIG. 18C is a view illustrating the rotation range of the camera.

FIGS. 18A, 18B, and 18C are views illustrating a rotation range of camera 11a. The surveillance camera is in a state where a top portion of cover 2 (not illustrated) faces a vertically downward direction. In this state, camera 11a is in a state where the portion projecting from the circular portion faces a vertically upward direction as illustrated in FIG. 18A. At this time, an up-and-down direction of landscape imaged by camera 11a matches an up-and-down direction of an image displayed by a display device.

As illustrated in FIG. 18B, camera 11a can rotate counterclockwise of FIG. 18B by up to angle θ. In other words, a maximum rotation angle of camera 11a counterclockwise of FIG. 18B is θ.

As illustrated in FIG. 18C, camera 11a can rotate clockwise of FIG. 18C by up to angle θ. In other words, a maximum rotation angle of camera 11a clockwise of FIG. 18C is θ.

Cameras 11c to 11d have the same configuration as camera 11a illustrated in FIGS. 14, 15, 16, 17, 18A, 18B, and 18C. That is, also cameras 11c to 11d can each rotate in the right-and-left direction by up to a predetermined angle with the imaging direction thereof as a rotation axis, as in camera 11a. However, members of cameras 11c to 11d, which correspond to connecting member 21ab of camera 11a, have a smaller length than connecting member 21ab (for example, refer to a connection portion between camera 11c and connecting member 21c of FIG. 4).

The information processing device connected to the surveillance camera may invert an up-and-down direction of an image captured by the surveillance camera or may invert a right-and-left direction by means of, for example, software.

Hereinafter, an example in which the surveillance camera is provided at an intersection will be described.

Figure 19:
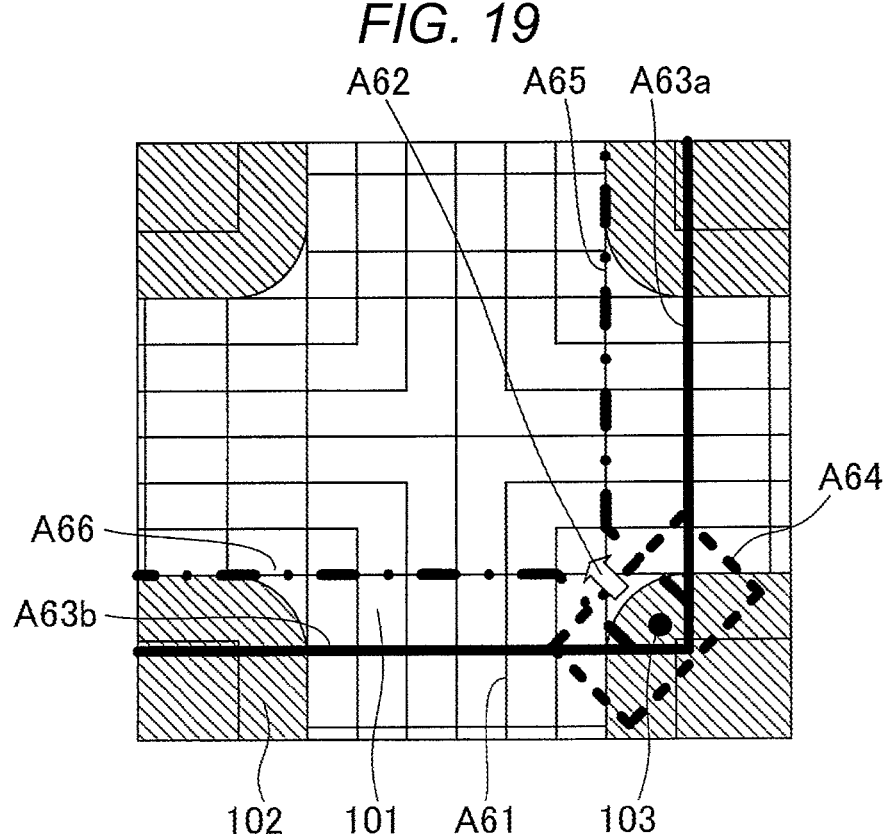
FIG. 19 is a view illustrating an example in which the surveillance camera is provided at an intersection.

FIG. 19 is a view illustrating an example in which the surveillance camera is provided at an intersection. A white portion of FIG. 19 is road 101. A portion of FIG. 19 in which hatching is used is sidewalk 102. A black portion of FIG. 19 is traffic light pole 103 on which the surveillance camera is provided. The surveillance camera is provided on pole 103, for example, such that cover 2 faces the ground. Grid-like lines A61 for showing an image captured by the surveillance camera in perspective overlap road 101.

Figure 20:
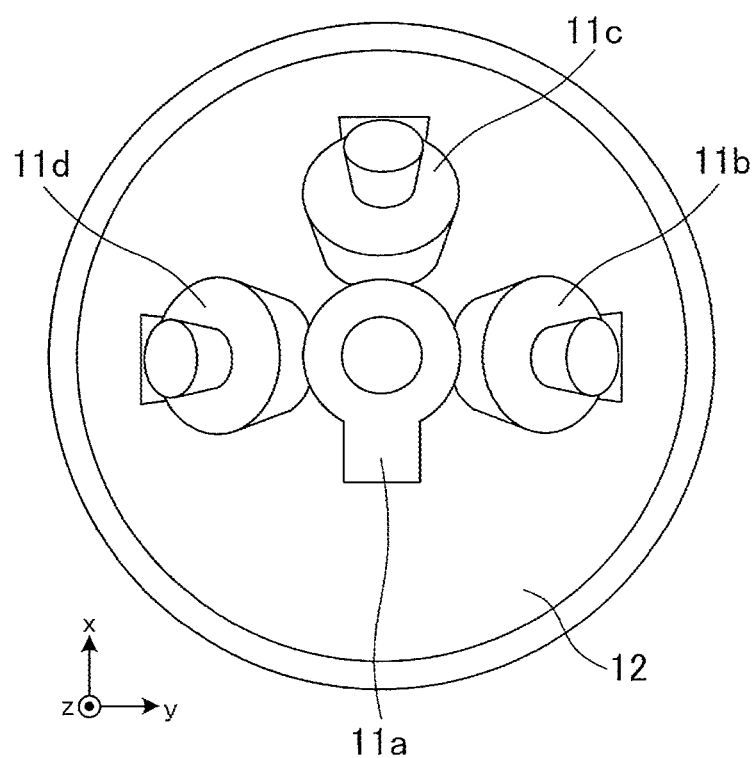
FIG. 20 is a view illustrating a camera provision example of the surveillance camera provided at the intersection.

FIG. 20 is a view illustrating a camera provision example of the surveillance camera provided at the intersection. In FIG. 20, the same elements as FIG. 3 are assigned with the same reference signs. FIG. 20 illustrates a simplified shape of the surveillance camera.

Cameras 11a to 11d are provided as illustrated in FIG. 20. For example, camera 11a is provided such that the imaging direction thereof is aligned with the top direction of cover 2. Cameras 11b and 11d are provided such that respective imaging directions face directions opposite to each other. Camera 11c is provided such that the imaging direction thereof is at 90 degrees with respect to the imaging directions of cameras 11b and 11d.

The surveillance camera is provided on traffic light pole 103 such that base 12 faces the ground. Therefore, camera 11a images the ground right below.

The surveillance camera is provided on the traffic light pole such that the imaging direction of camera 11c is aligned with the direction of arrow A62 of FIG. 19. A region enclosed with thick solid lines A63a and A63b of FIG. 19 is an imaging range of camera 11c. A region enclosed with dotted line A64 of FIG. 19 is an imaging range of camera 11a. A region on the right, in the figure, of one-dot chain line A65 of FIG. 19 is an imaging range of camera 11d. A region on a lower side, in the figure, of one-dot chain line A66 of FIG. 19 is an imaging range of camera 11b.

Figure 21:
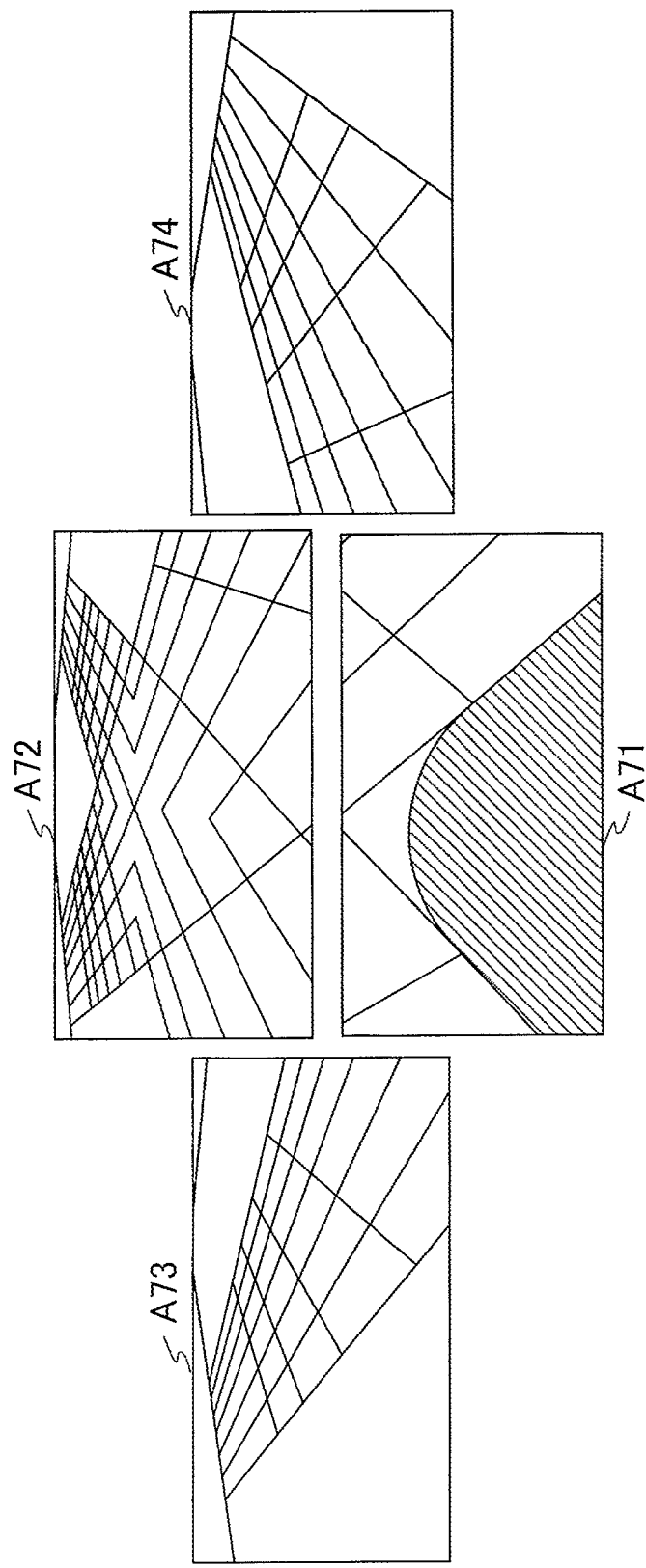
FIG. 21 is a view illustrating an example of an image captured in the camera provision example of FIG. 20.

FIG. 21 is a view illustrating an example of an image captured in the camera provision example of FIG. 20. When the intersection of FIG. 19 is imaged in the camera disposition illustrated in FIG. 20, the display device displays, for example, images A71 to A74 illustrated in FIG. 21.

Image A71 of FIG. 21 is an image captured by camera 11a of FIG. 20. Camera 11a images the ground right below by the imaging direction thereof being aligned with the top direction of cover 2.

Image A72 is an image captured by camera 11c of FIG. 20. Image A73 is an image captured by camera 11b of FIG. 20. Image A74 is an image captured by camera 11d of FIG. 20.

Figure 22:
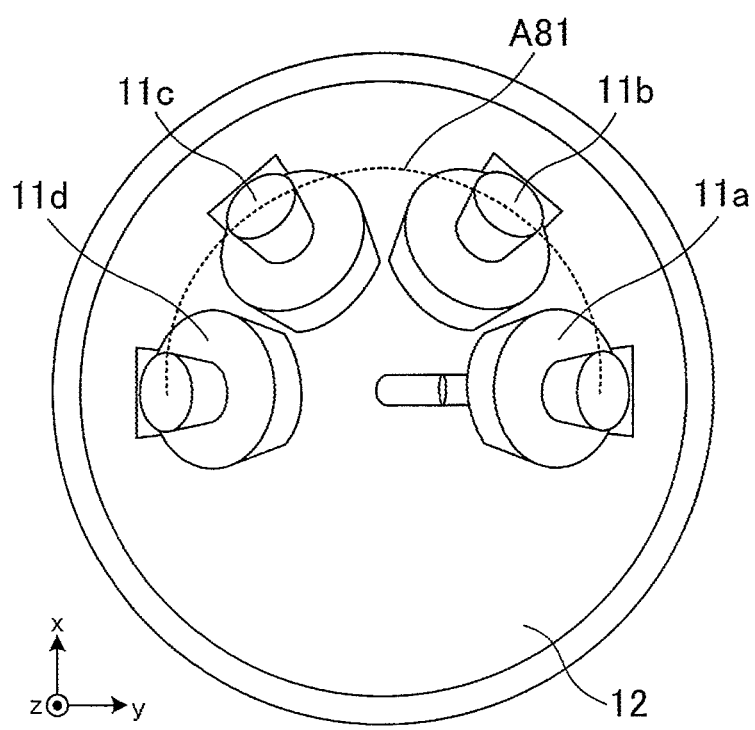
FIG. 22 is a view illustrating another camera provision example.

FIG. 22 is a view illustrating another camera provision example. In FIG. 22, the same elements as FIG. 20 are assigned with the same reference signs. FIG. 22 illustrates a simplified shape of the surveillance camera.

In FIG. 22, cameras 11a to 11d are disposed on base 12 so as to be equidistant to each other on a semicircular arc. Cameras 11a and 11d are disposed on both ends of the semicircular arc.

For example, dotted line A81 illustrated in FIG. 22 indicates the semicircular arc. Cameras 11a to 11d are disposed so as to be substantially equidistant to each other on the semicircular arc indicated with dotted line A81.

Cameras 11a and 11d are disposed on both ends of the semicircular arc indicated with dotted line A81.

When cameras 11a to 11d are disposed as in FIG. 22, a 180-degree panoramic image is obtained by four cameras 11a to 11d. When cameras 11a to 11d are disposed as in FIG. 3, a 360-degree panoramic image is obtained.

The surveillance camera is provided on the traffic light pole such that the x axis direction of FIG. 22 is aligned with the direction of arrow A62 of FIG. 19.

Figure 23:
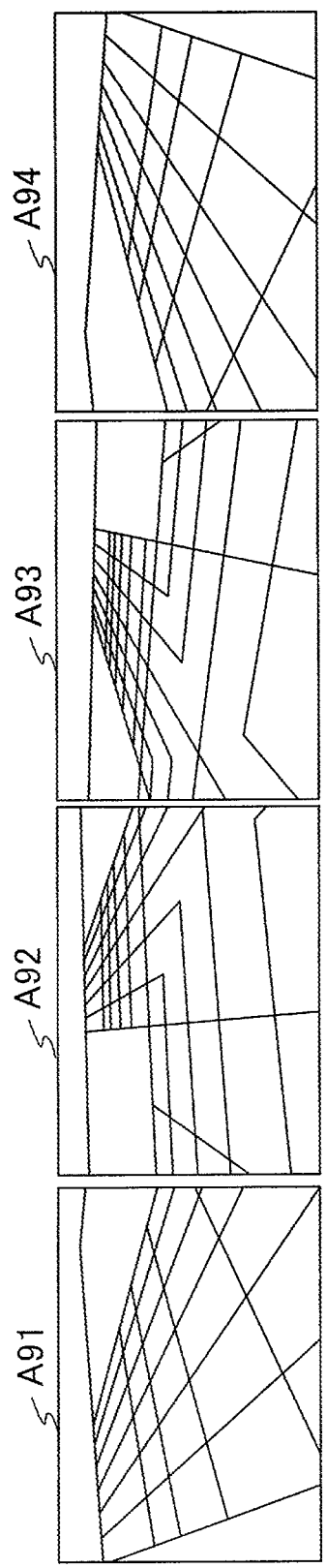
FIG. 23 is a view illustrating an example of an image captured in the camera provision example of FIG. 22.

FIG. 23 is a view illustrating an example of an image captured in the camera provision example illustrated in FIG. 22. When the intersection of FIG. 19 is imaged in the camera disposition illustrated in FIG. 22, the display device displays, for example, images A91 to A94 illustrated in FIG. 23.

Image A91 of FIG. 23 is an image captured by camera 11a of FIG. 22. Image A92 is an image captured by camera 11b of FIG. 22. Image A93 is an image captured by camera 11c of FIG. 22. Image A94 is an image captured by camera 11d of FIG. 22.

A panoramic image illustrated in FIG. 23 is not continuous in a horizontal direction. For example, a road extending to the left in image A92 is not connected to a road in image A91. In addition, a road extending to the right in image A93 is not connected to a road in image A94.

As described above, cameras 11a to 11d can each rotate in the right-and-left direction with the imaging direction thereof as a rotation axis (for example, refer to FIGS. 18A to 18C). A panoramic image can be made continuous in the horizontal direction by rotating cameras 11a to 11d disposed on the semicircular arc for a panoramic image.

Figure 24:
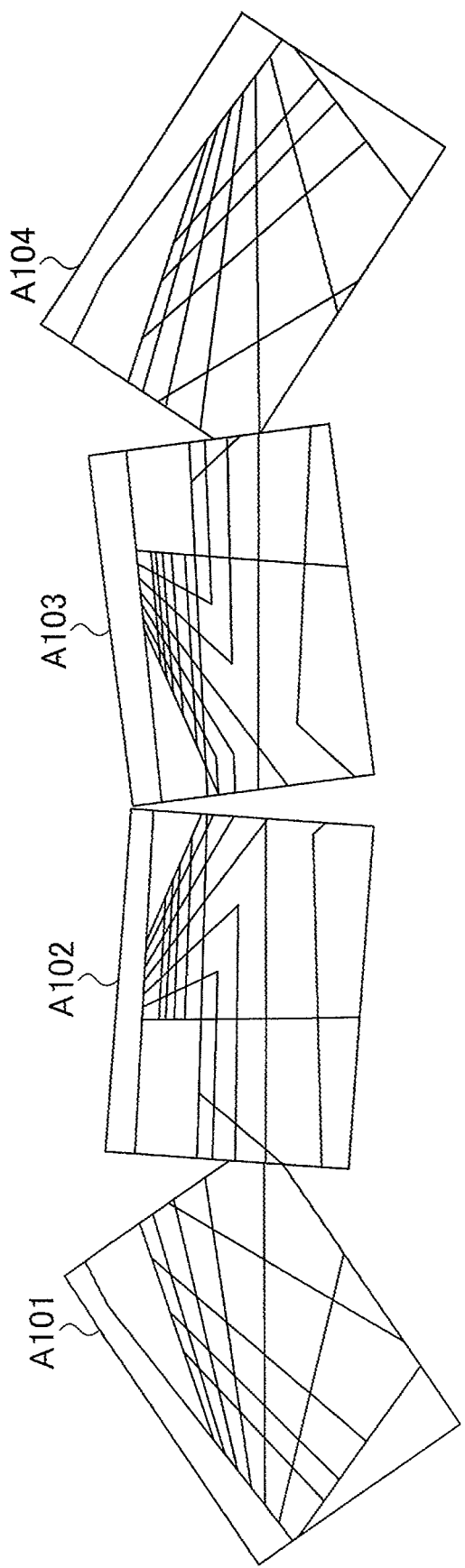
FIG. 24 is a view illustrating an example of a panoramic image which is continuous in a horizontal direction.

FIG. 24 is a view illustrating an example of a panoramic image which is continuous in the horizontal direction. Image A101 of FIG. 24 is an image captured by camera 11a of FIG. 22. Image A102 is an image captured by camera 11b of FIG. 22. Image A103 is an image captured by camera 11c of FIG. 22. Image A104 is an image captured by camera 11d of FIG. 22.

By rotating each of cameras 11a to 11d in the right-and-left direction with the imaging direction thereof as a rotation axis, a panoramic image can be made continuous in the horizontal direction. For example, when camera 11a is rotated counterclockwise when seen from the front, image A91 illustrated in FIG. 23 rotates as illustrated in image A101 of FIG. 24. In addition, when camera 11d is rotated clockwise when seen from the front, image A94 illustrated in FIG. 23 rotates as illustrated in image A104 of FIG. 24. Cameras 11b and 11c are also rotated such that a panoramic image is continuous in the horizontal direction.

The maximum rotation angles of cameras 11a to 11d are angles at which images captured by two cameras imaging both ends of a panoramic image are continuous with images captured by other cameras in the horizontal direction. For example, the maximum rotation angles of cameras 11a to 11d are angles at which images captured by two cameras 11a and 11d illustrated in FIG. 22 imaging both ends of a panoramic image are continuous with images captured by other cameras 11b and 11c in the horizontal direction. In other words, when two cameras imaging both ends of a panoramic image are rotated by up to maximum rotation angles in any one of sides in the right-and-left direction, images captured by the remaining two cameras can be continuous in the horizontal direction.

Due to stopper mechanisms (for example, lever 72 and stoppers 83a and 83b illustrated in FIG. 17), cameras 11a to 11d do not rotate beyond the maximum rotation angles. Therefore, if two cameras imaging both ends of a panoramic image are rotated by up to maximum rotation angles, the panoramic image can be made continuous in the horizontal direction. For example, two cameras 11a and 11d imaging both ends of the panoramic image illustrated in FIG. 22 may be rotated in any one direction of the right-and-left direction until the rotation is stopped by the stopper mechanisms. That is, it becomes easier for a user to make an adjustment for making a panoramic image continuous in the horizontal direction.

For example, marks indicating rotation angles of two cameras interposed between two cameras imaging both ends of a panoramic image may be attached to the back of cover 83 in order to make a panoramic image horizontal. For example, a user can make images interposed between images on both ends of a panoramic image continuous in the horizontal direction by rotating cameras until the marks attached to the back of cover 83 come to the position of claw 72a of lever 72.

In addition, although a panoramic image obtained by four cameras 11a to 11d is described above, the disclosure can be applied to a panoramic image obtained by three cameras. For example, the disclosure can be applied to a case where one camera 11a faces the top direction of cover 2 and the remaining cameras 11b to 11d capture a panoramic image, as illustrated in FIG. 20. A maximum rotation angle in this case is different from maximum rotation angles for a panoramic image obtained by four cameras.

The surveillance camera receives external shock in some cases. The surveillance camera of the disclosure has a mechanism that relieves external shock.

Figure 25:
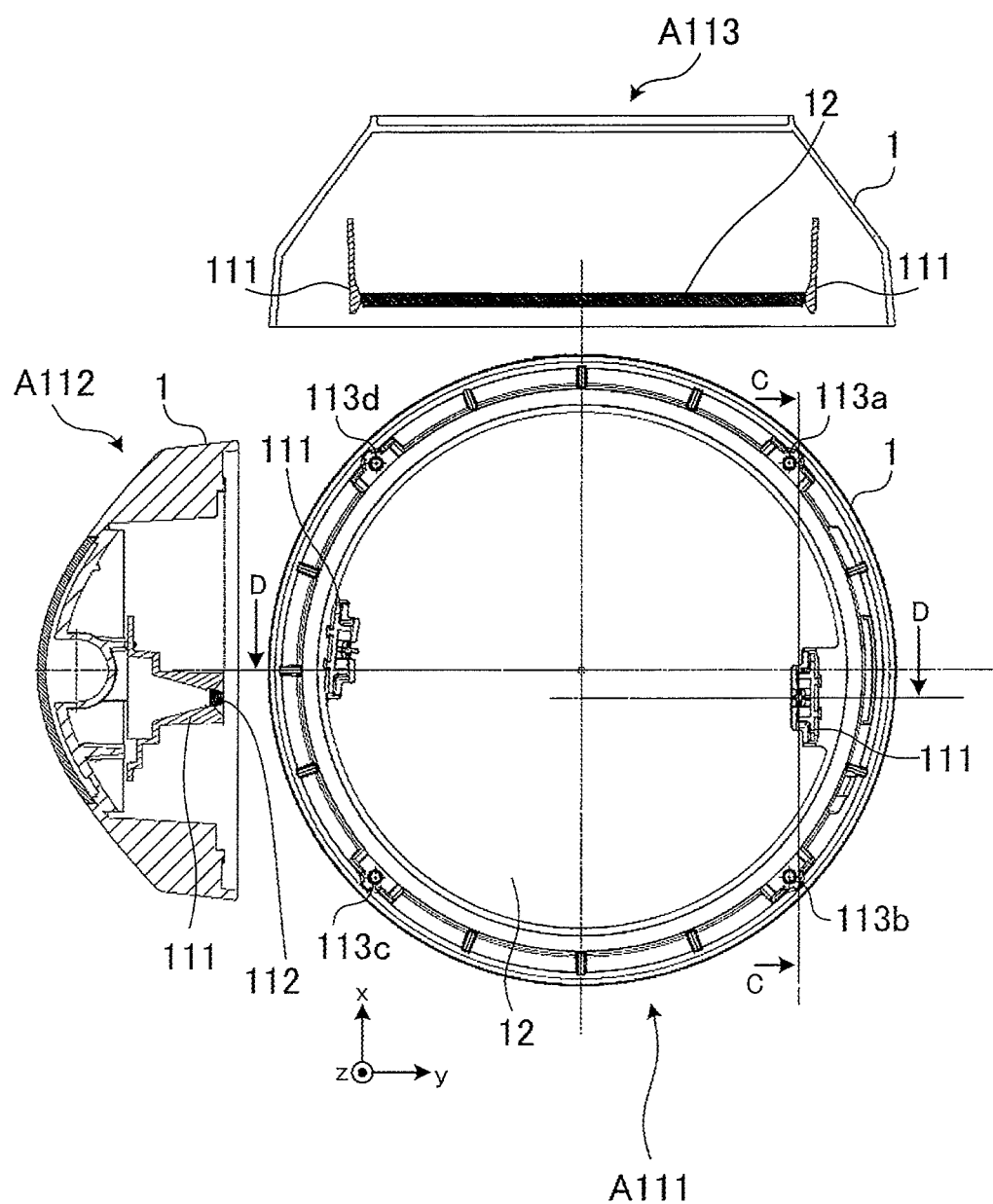
FIG. 25 is a view illustrating a mechanism that relieves external shock to the surveillance camera.

FIG. 25 is a view illustrating the mechanism that relieves external shock to the surveillance camera. In FIG. 25, the same elements as FIG. 3 are assigned with the same reference signs. In FIG. 25, the illustration of cameras 11a to 11d is omitted.

The surveillance camera indicated with arrow A112 of FIG. 25 is a sectional view taken along arrow C-C, which illustrates the surveillance camera indicated with arrow A111. The surveillance camera indicated with arrow A113 of FIG. 25 is a sectional view taken along arrow D-D, which illustrates the surveillance camera indicated with arrow A111. As illustrated in FIG. 25, the surveillance camera has guides 111 that regulate the movement of base 12.

For example, a biasing member (not illustrated), such as a spring, biases base 12 in the direction of cover 2 (+z axis direction). Base 12 is regulated by guides 111 so as not to come out from housing 1.

As illustrated in the sectional view taken along arrow C-C, guides 111 each have a groove of which the width becomes larger as approaching the bottom of housing 1.

Each of the grooves of guides 111 accommodates a part of base 12 (protrusion). Protrusions 112 illustrated in the sectional view taken along arrow C-C are protrusions of base 12 accommodated in the grooves of guides 111 in the sectional view taken along arrow C-C.

The widths of the grooves of guides 111 each become smaller as approaching in the direction of cover 2. The narrowest width of each of the grooves is smaller than the widths of protrusions 112 of base 12. Accordingly, base 12 does not come out from housing 1.

Protrusions 112 of base 12 can move freely within the areas of the grooves of guides 111. As described above, the widths of the grooves of guides 111 become larger as approaching toward the bottom of housing 1. Accordingly, the freedom of the movement of base 12 increases as approaching toward the bottom of housing 1.

The surveillance camera has screws 113a to 113d. Screws 113a to 113d pass through holes formed in base 12 and are fixed to housing 1. The diameters of heads of screws 113*a* to 113*d* are larger than the diameters of the holes formed in base 12. In addition, the diameters of cylindrical portions of screws 113*a* to 113*d* are smaller than the diameters of the holes formed in base 12. Accordingly, the heads of screws 113*a* to 113*d* allow base 12 not to come out from housing 1. In addition, since the diameters of the holes formed in base 12 are larger than the diameters of the cylindrical portions of screws 113*a* to 113*d*, the base can settle inside housing 1 in an inclined state (refer to FIG. 27B).

Figure 26:
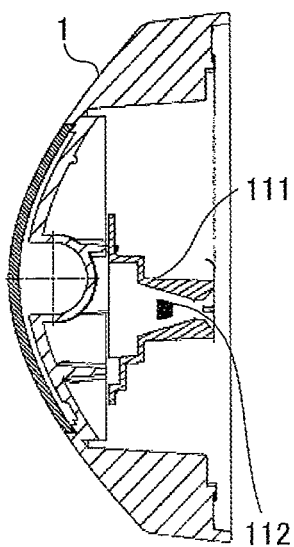
FIG. 26 is a view illustrating a state where the base has settled toward a bottom of the housing.

FIG. 26 is a view illustrating a state where base 12 has settled toward the bottom of housing 1. FIG. 26 is a sectional view taken along arrow C-C, which illustrates the surveillance camera illustrated in FIG. 25. In FIG. 26, the same elements as FIG. 25 are assigned with the same reference signs.

For example, when shock is administered from the outside of cover 2, base 12 settles toward the bottom of housing 1. For example, protrusions 112 of base 12 move toward the bottom of housing 1 as illustrated in FIG. 26. Accordingly, the surveillance camera can distribute a force applied to cameras 11*a* to 11*d*. The biasing member causes base 12 to return to an original position.

As illustrated in FIG. 25, the freedom of the movement of base 12 increases as approaching toward the bottom of housing 1. Therefore, even when forces are applied from various directions, base 12 can distribute the forces.

Figure 27A:
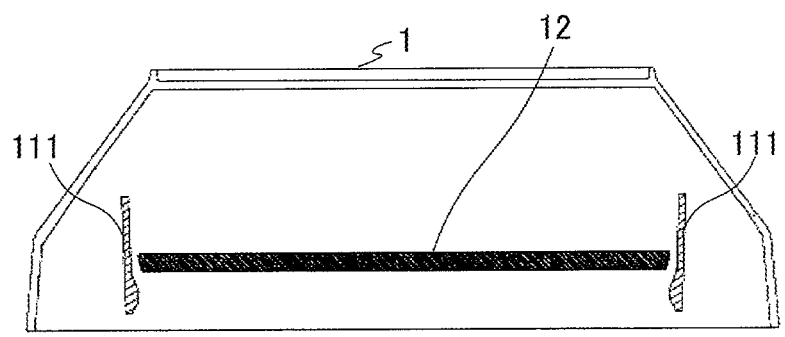
FIG. 27A is a view illustrating the state where the base has settled toward the bottom of the housing.
Figure 27B:
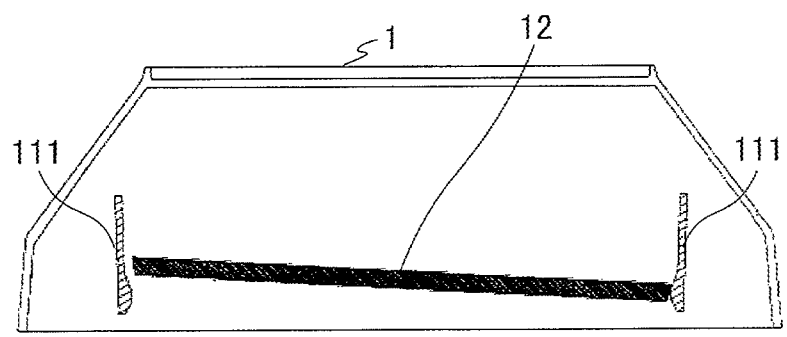
FIG. 27B is a view illustrating the state where the base has settled toward the bottom of the housing.

FIGS. 27A and 27B are views illustrating a state where base 12 has settled toward the bottom of housing 1. FIGS. 27A and 27B are sectional views taken along arrow D-D, which illustrate the surveillance camera illustrated in FIG. 25. In FIGS. 27A and 27B, the same elements as FIG. 25 are assigned with the same reference signs.

FIG. 27A illustrates a state of base 12 when a force is evenly applied to the entire base 12. In a case where a force is evenly applied to the entire base 12, the entire base 12 settles toward the bottom of housing 1 as illustrated in FIG. 27A.

FIG. 27B illustrates a state of base 12 when a force is applied to a part of base 12. In a case where a force is applied to a part of base 12, the part of base 12 settles toward the bottom of housing 1 as illustrated in FIG. 27B. As illustrated in FIG. 25, since each of the grooves of guides 111 is formed such that the width thereof becomes larger as approaching the bottom of housing 1, base 12 can settle toward the bottom of housing 1 in an inclined state as illustrated in FIG. 27B. That is, base 12 can distribute a force applied from various directions.

As described above, the dome type surveillance camera includes base 12, connecting members 21*aa*, 21*ab*, 21*b*, 21*c*, and 21*d* connected to base 12, the plurality of cameras 11*a* to 11*d* connected to connecting members 21*aa*, 21*ab*, 21*b*, 21*c*, and 21*d* such that the respective imaging directions move in the elevation angle direction with respect to base 12, and dome type cover 2 fixed to base 12 so as to cover connecting members 21*aa*, 21*ab*, 21*b*, 21*c*, and 21*d* and the plurality of cameras 11*a* to 11*d*. One camera 11*a* out of the plurality of cameras 11*a* to 11*d* moves such that the imaging direction thereof is aligned with the top of cover 2.

Accordingly, the imaging direction of the surveillance camera can be aligned with various directions. For example, the imaging direction of the surveillance camera can be aligned with the vertically downward direction such as the ground. Since the imaging direction of the surveillance camera can be aligned with various directions, for example, a vertically downward area such as the ground can be imaged clearly. In addition, the surveillance camera can cause the vertically downward area, such as the ground, to be displayed, for example, at the center of the display device.

In addition, the dome type surveillance camera includes base 12, connecting members 21*aa*, 21*ab*, and 21*b* to 21*d* connected to base 12, cameras 11*a* to 11*d* connected to connecting members 21*aa*, 21*ab*, and 21*b* to 21*d*, and dome type cover 2 fixed to base 12 so as to cover connecting members 21*aa*, 21*ab*, and 21*b* to 21*d* and cameras 11*a* to 11*d*. Base 12 includes circular rail 41 of which the center is at a position immediately below the top of cover 2. Connecting members 21*b* to 21*d* slide along rail 41, and connecting members 21*aa* and 21*ab* are connected to base 12 immediately below the top of cover 2.

Accordingly, the imaging direction of the surveillance camera can be aligned with various directions. For example, the imaging direction of the surveillance camera can be aligned with various azimuth directions since cameras 11*b* to 11*d* slide along rail 41. In addition, since camera 11*a* can face the top of cover 2, for example, the imaging direction of the surveillance camera can be aligned with the vertically downward direction such as the ground.

In addition, the dome type surveillance camera includes base 12, connecting members 21*aa*, 21*ab*, 21*b*, 21*c*, and 21*d* connected to base 12, the plurality of cameras 11*a* to 11*d* connected to connecting members 21*aa*, 21*ab*, 21*b*, 21*c*, and 21*d*, and dome type cover 2 fixed to base 12 so as to cover connecting members 21*aa*, 21*ab*, 21*b*, 21*c*, and 21*d* and the plurality of cameras 11*a* to 11*d*. The plurality of respective cameras 11*a* to 11*d* are connected to connecting members 21*aa*, 21*ab*, 21*b*, 21*c*, and 21*d* so as to be rotatable by up to predetermined rotation angles in both right and left directions with respective imaging directions as axes, such that a captured panoramic image is continuous in the horizontal direction. The predetermined rotation angles each are an angle at which images obtained by two cameras imaging both ends of the panoramic image, out of the plurality of cameras 11*a* to 11*d*, are continuous with images captured by other cameras in the horizontal direction.

Accordingly, in the surveillance camera, cameras 11*a* to 11*d* can be easily adjusted such that a panoramic image is continuous in the horizontal direction. For example, it is sufficient that a user rotates cameras 11*a* to 11*d* imaging both ends of a panoramic image by up to predetermined rotation angles.

Although it is described that the imaging directions of cameras 11*a* to 11*d* are adjusted by a user's hand, the adjustment is not limited thereto. For example, the surveillance camera may have a driving device that can remotely control the imaging directions of cameras 11*a* to 11*d*.

What is claimed is:

1. A dome type surveillance camera comprising:
   a base;
   a plurality of cameras;
   a first connecting section connected on the base and connected with one first camera out of the plurality of cameras;
   a plurality of second connecting sections connected on the base and connected with each of a plurality of second cameras excluding the first camera out of the plurality of cameras;
   a hemispherical cover fixed to the base so as to cover the first connecting section, the second connecting sections, and the plurality of cameras; and
   a circular rail which is provided on the base and of which a center is immediately below a top of the cover,
   wherein the first connecting section has a first member which is erected from immediately below the top of the cover on the base and freely turns about a portion immediately below the top, and a second member which has one end connected to the first member and the other end which is connected to the first camera and freely turns in an elevation angle direction, and the first member and the second connecting sections slide along the circular rail.

2. The surveillance camera of claim 1, wherein the second member is connected to the first member such that the other end moves to traverse a top direction of the cover.

3. The surveillance camera of claim 1, wherein each of the plurality of second cameras is connected to the plurality of the second connecting sections such that an imaging direction moves in an elevation angle direction with respect to the base and the imaging direction moves so as not to traverse a top direction of the cover.

4. The surveillance camera of claim 1, wherein at least one of the plurality of the second connecting sections has a first gripper, and the at least one of the plurality of the second connecting sections slides along the circular rail in response to an operation of the first gripper by a user.

5. The surveillance camera of claim 1, wherein the first connecting section has a second gripper, and the first connecting section rotates in an azimuth direction of the base in response to an operation of the second gripper by a user.

6. A dome type surveillance camera comprising:

a base;

a plurality of cameras;

a plurality of connecting sections connected on the base and connected with the plurality of cameras;

a hemispherical cover fixed to the base so as to cover the connecting sections and the plurality of cameras; and a circular rail which is provided on the base and of which a center is immediately below a top of the cover, wherein the plurality of connecting sections slides along the circular rail, and wherein one camera out of the plurality of cameras is configured to move to be in a vertical position towards a top position of the cover, such that an optical axis of the one camera in the vertical position is parallel with a vertical axis of the cover.

* * * * *